United States Patent [19]

Matsui

[11] 4,354,776
[45] Oct. 19, 1982

[54] PRESSURIZED GAS TRANSPORTER AND METHOD

[75] Inventor: Osamu Matsui, Osaka, Japan

[73] Assignee: Matsui Manufacturing Co., Ltd., Osaka, Japan

[21] Appl. No.: 177,487

[22] Filed: Aug. 12, 1980

[30] Foreign Application Priority Data

Aug. 13, 1979 [JP] Japan ............................... 54-103059
Jun. 5, 1980 [JP] Japan ................................ 55-76362

[51] Int. Cl.³ .................................................. B65G 53/34
[52] U.S. Cl. ........................................ 406/23; 406/39; 406/52; 406/94; 406/122; 414/420
[58] Field of Search ................... 406/23, 39, 52, 73, 406/91, 94, 122; 414/419, 420, 421; 141/372, 113

[56] References Cited

U.S. PATENT DOCUMENTS

2,335,572 11/1943 Schroeder ........................... 414/420
3,253,725 5/1966 Paton ................................... 414/421
3,905,650 9/1975 Freeman .............................. 406/94

FOREIGN PATENT DOCUMENTS

1041834 9/1966 United Kingdom ................. 406/91

*Primary Examiner*—Jeffrey V. Nase
*Attorney, Agent, or Firm*—Armstrong, Nikaido, Marmelstein & Kubovcik

[57] ABSTRACT

Transporter and method for directly transporting powdered materials or the like by a pressurized gas from the delivery container to a hopper connected to packaging or pilling machines through a pipe arrangement connected to the container at its one end and the hopper at its other end. The container is combined with a conical part to form an airtight system by a connecting device, inverted by a turning mechanism and then connected to the pipe arrangement through the conical part, and thereafter, the powdered materials in the container are transported to the hopper by the pressurized gas fed from pressurized gas feed-pipes connected to specified locations of the sigmoid pipe.

8 Claims, 16 Drawing Figures

PRESSURIZED GAS TRANSPORTER AND METHOD

BACKGROUND OF THE INVENTION

This invention relates to a pressurized gas transporter and method. More particularly, it relates to a transporter for transporting powdered materials or the like by means of a pressurized gas without any intermediary steps.

A factory dealing with medicines or chemicals has a storage tank for powdered materials or the like (powdered materials or the like are defined for this invention to include particles, pellets and capsules) of the medicines or the chemicals. Such a tank is usually installed at relatively low position so that the powdered materials transported to the factory can be easily and readily off-loaded into the tank. Before mixing, packaging or pilling of the powdered materials, they are usually once removed from the storage tank and placed in a portable container and then transported to a hopper connected to the packaging or pilling machines, and if necessary, through a mixing tank for mixing the said powdered materials with others.

The removal of the contents from the storage tank to the hopper by means of the portable container is disadvantageous in that such a step requires unnecessary labor and gives many opportunities to expose the contents to air thereby causing contamination, deterioration and/or loss through scattering of the powdered materials.

SUMMARY OF THE INVENTION

The transporter and method of this invention which overcome the abovediscussed disadvantages of the prior art, relates to a pressurized gas transporter comprising; (1) a transporting means having a conical part and a pipe arrangement connected to the conical part at its one end, the pipe arrangement being connected to a hopper at its other end; (2) a carrier cart having a connecting means for uniting a container, wherein powdered materials or the like are stored, to the said conical part forming an airtight system and a turning means for inverting the said container together with the said conical part.

The connecting means has a locking means for fixing the conical part to the cart, an elevator for supporting the container thereon and a frame for connecting the locking means with the elevator. The turning means has a shaft connected to a motor at its one end, passing through a frame of the cart, and connected to the frame of the connecting means at its other end. The pipe arrangement comprises a sigmoid-shape transporting pipe, a first pressurized gas feed-pipe, a second pressurized gas feed-pipe, and a third pressurized gas feed-pipe; the sigmoid pipe being connected to the discharging section of the conical part at its lower end, to the hopper at its higher end, to the second feed-pipe at its lowest base and to the third feed-pipe at a specified intermediate location thereon. The first pressurized gas feed-pipe is connected to the discharging section of the conical part.

The conical part is fixed to the locking means. The container is placed on the elevator and an air-tight connection is formed with the conical part by raising the elevator to the point where the container and the conical part are joined. The container is then inverted, together with the conical part, by turning the shaft. Pressurized gas is injected into the pipe arrangement, thereby transporting the powdered materials or the like from the container to the hopper.

Thus, the invention described herein makes possible the objectives of (a) smooth transporting of the powdered materials or the like in a simple way, (b) transporting them through a closed system, (c) transporting them without contamination or deterioration, and (d) transporting them without loss through scattering.

BRIEF DESCRIPTION OF THE DRAWINGS

This invention may be better understood and its numerous objectives and advantages will become apparent to those skilled in the art by reference to the accompanying drawings as follows.

DESCRIPTION OF THE PREFERRED EMBODIMENTS

Figure 1:
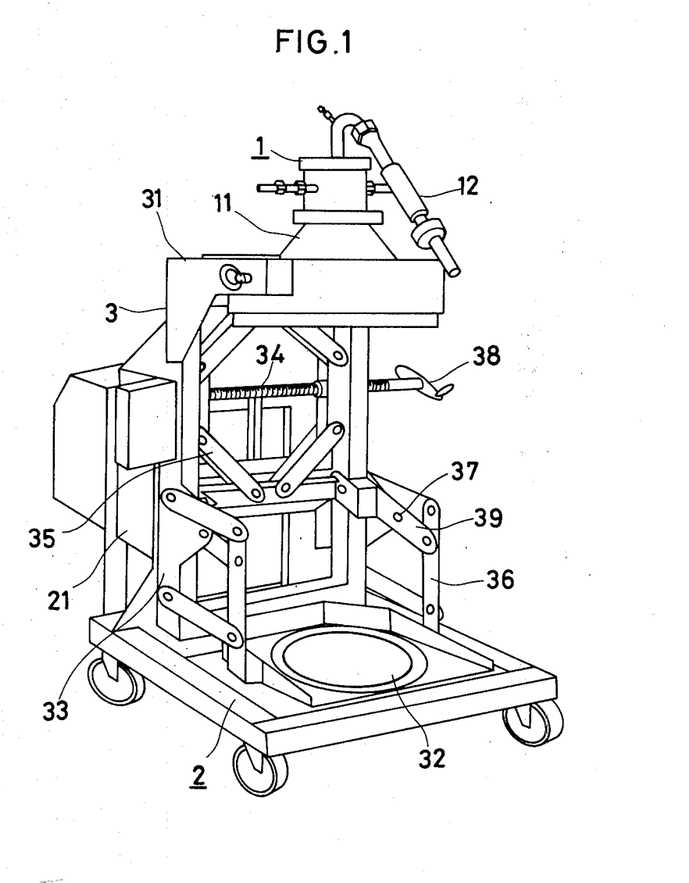
FIG. 1 is a partial perspective view of the preferred pressurized gas transporter of this invention.
Figure 2:
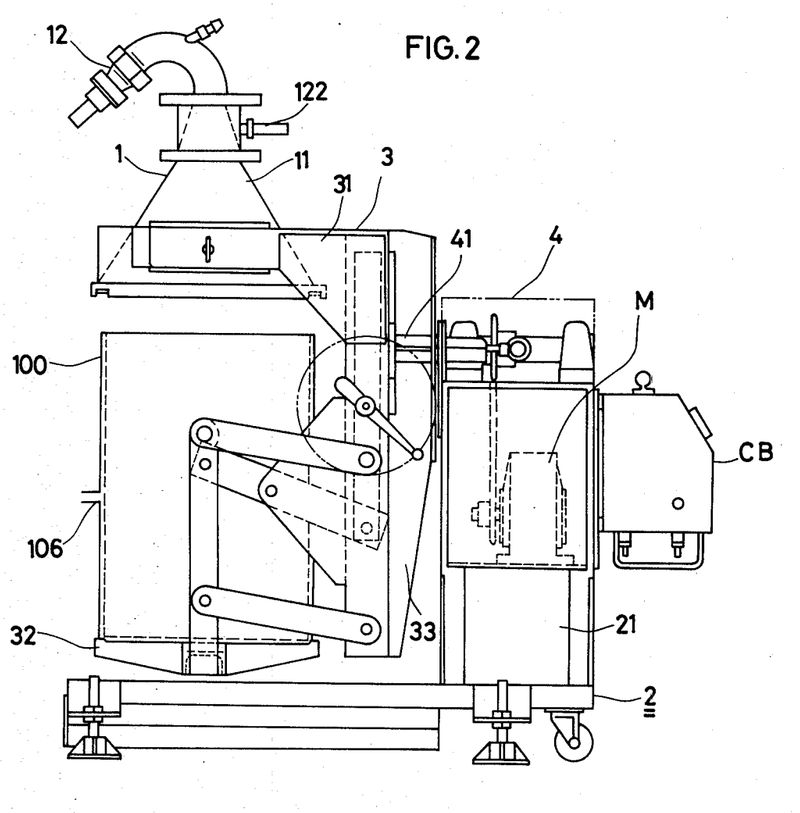
FIG. 2 is a partial side view of the transporter of this invention, showing a portable container being elevated by an elevator.

FIG. 1 and FIG. 2 show the pressurized gas tranporter of this invention, which has a transporting means 1 and a carrier cart 2. The transporting means 1 has a conical part 11 and a pipe arrangement 12. The carrier cart 2 has a connecting means 3 and a turning means 4.

Figure 5:
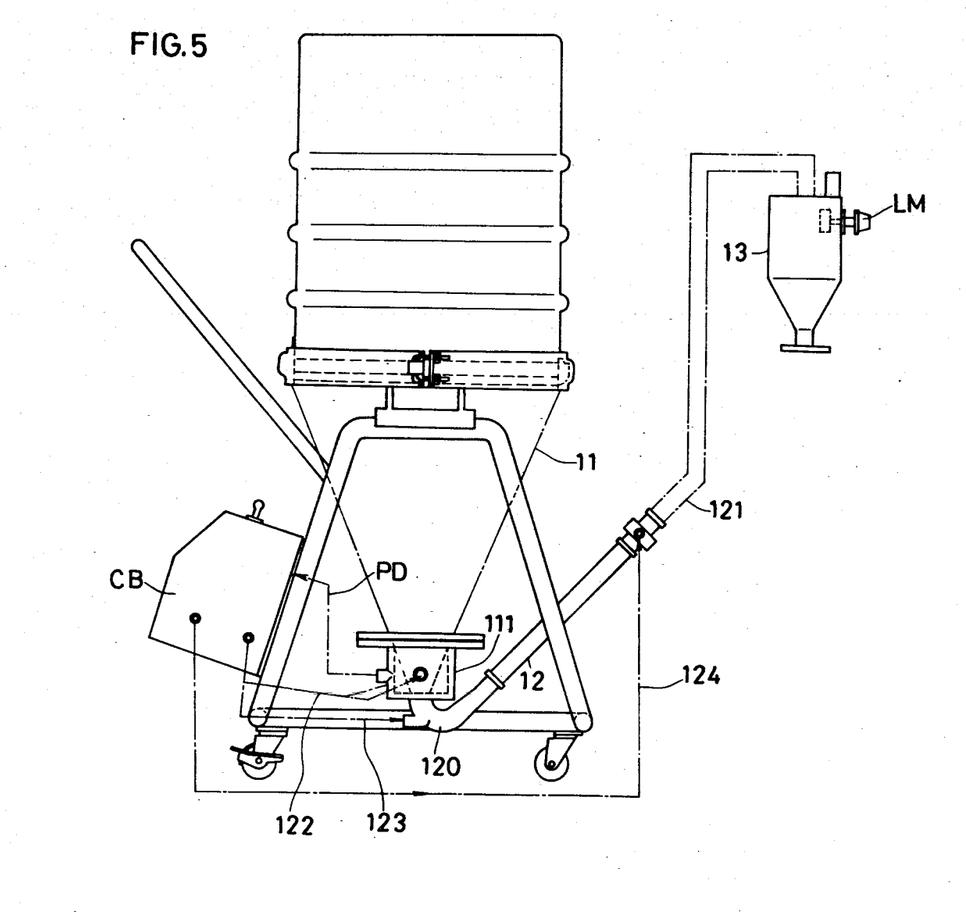
FIG. 5 is a schematic elevational view of the pipe arrangement of this invention.

The conical part 11 has a discharging section 111 at its one end. The discharging section 111 connects to the pipe arrangement 12, which as shown in FIG. 5, comprises an almost sigmoid-shape transporting pipe 121, a first pressurized gas feed-pipe 122, a second pressurized gas feed-pipe 123, and a third pressurized gas feed-pipe 124. The sigmoid pipe 121 is connected to the discharging section 111 at its lower end, to a hopper 13 at its higher end, to the second feed-pipe 123 at its lowest base 120, and to the third feed-pipe 124 at a specified location thereon. The first feed-pipe 122 is connected to the discharging section 111.

The connecting means 3 is a means for making an airtight seal between a container 100, where powdered materials or the like are stored, and the conical part 11. The connecting means 3 has a locking means 31 for fixing the conical part 11 to the cart 2 and an elevator 32 for supporting the container 100 thereon. The locking means 31 and the elevator 32 are coupled by means of a frame 33.

The turning means 4 inverts the container 100 together with the conical part 11 by means of a shaft 41, which is connected to the frame 33 of the connecting means 3 at its one end and a motor M at its other end through a frame 21 of the cart 2.

Figure 9:
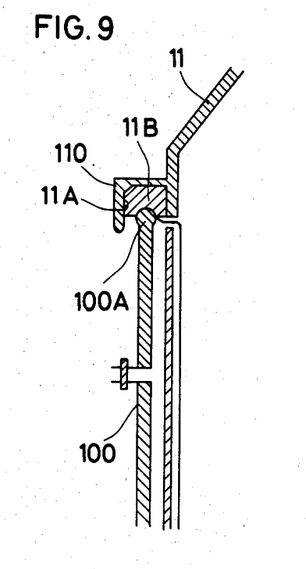
FIG. 9 is a sectional view of connection mechanism of the container with the conical part.

The conical part 11, as shown in FIG. 9, has a recession 11A around the circumference of the larger end 110 in a manner that the top rim 100A of the outer cylinder of the container 100 is bound airtight inside the recession 11A sealed with a packing material 11B held in the recession 11A.

Figure 10:
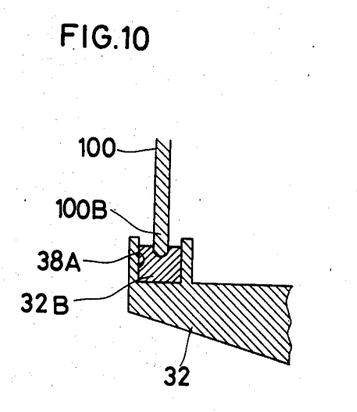
FIG. 10 is a sectional view of the positioning mechanism of the elevator with the container.

The elevator 32, as shown in FIG. 10, is provided with positioning structure 38A at the rim thereof in a manner that the bottom rim 100B of the outer cylinder of the container 100 is bound airtight inside the recession 32A sealed with a packing material 32B held in the recession 32A.

FIG. 8 shows a process for transporting the powdered materials in the container 100 from the container 100 to the hopper 13. The container 100 comprises a metallic cylinder and a non-pressure-resisting tank placed inside the metallic cylinder. The non-pressure-resisting tank comprises a polyehtylene envelope (the delivery container) 101 containing the powdered materials 102 therein and a fiber drum 103 enveloping the polyethylene envelope 101 therein.

Figure 8A:
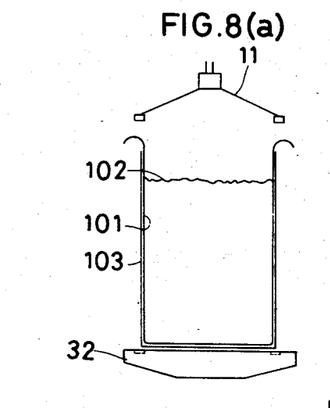
FIGS. 8(a), 8(b), 8(c) and 8(d) are schematic illustration of the process of this invention.
Figure 8B:
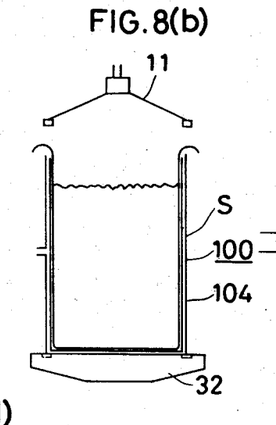

As shown in FIG. 8(a), the non-pressure-resisting tank is put on the predetermined position of the elevator 32. The tank is then covered with the metallic cylinder 104 with a space S between them as shown in FIG. 8(b).

Figure 8C:
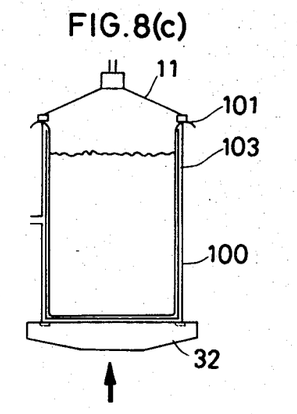

As shown in FIG. 8(c), the container 100 is connected in an airtight manner to the conical part 11, which has been fixed to the locking means 31 comprising a bracket, by raising the elevator 32. A screw 34 parallel to the frame 21 runs through the bracket 31. The screw 34 has a crank handle 38. A hexagonal arm 35 is expanded horizontally by the screw 34, thus causing a vertical lifting of the lift arm 34. A square arm 36 is lifted by the lift arm 39 at a fulcrum 37. The elevator base 32 is mounted on the bottom of the square arm 36. Thus, upon turning the crank handle 38, the elevator 32 is easily raised or lowered. The top rim 100A of the container 100 is connected with an airtight seal by means of the packing material 11B in the recession 11A of the conical part 11 as shown in FIG. 9. The bottom rim 100B of the container 100 is likewise connected with an airtight seal to the elevator 32 through the packing 32B.

Figure 8D:
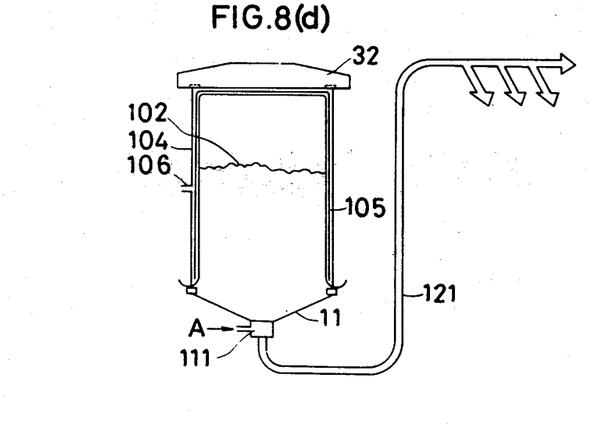

The container is then inverted together with the conical part 11 and the bracket 31 to an angle of approximately 180° by turning the shaft 41 by means of the motor M. FIG. 8(d) shows the inverted container 100 in which the powdered materials 102 are located toward the discharging section 111 of the conical part 11. The cylinder 104 contains at least three springs 105 therein. These springs 105 support the fiber drum 103 within the cylinder 104, so that the drum 103 does not move within the cylinder 104 during rotation. Instead of the springs, a supporting frame may be attached to the drum 103.

A pressurized gas such as air, an inert gas, nitrogen, argon, etc. is injected into the first, second and third feed-pipes 122, 123, & 124. The powdered materials 102 are transported by means of the pressurized gas from the discharging section 111 to the hopper 13 through the sigmoid pipe 121. The pressure of the gas used is usually about 1–0.8 Kg/cm$^2$. The internal pressure of the envelope 101 is about 0.2–0.3 Kg/cm$^2$. The external pressure of the envelope 101 is kept equal to the internal pressure by supplying a pressurized gas to the space S through a hole 106 of the cylinder 104.

Figure 3A:
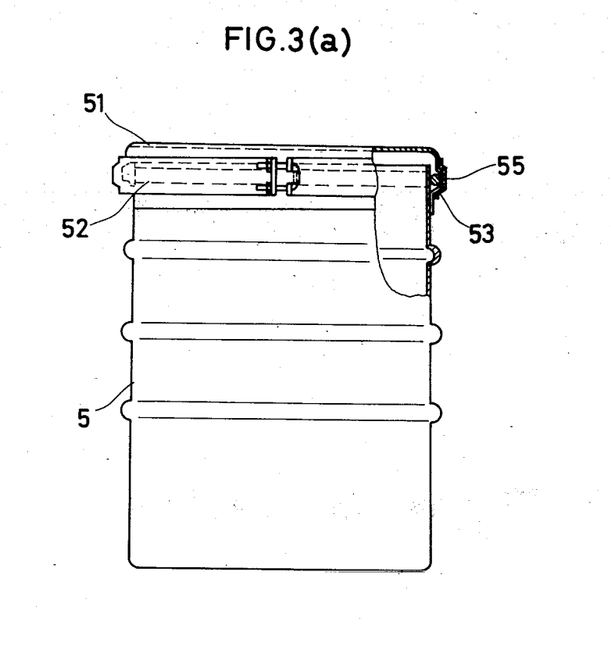
FIG. 3(a) is a side view of a pressure-resisting container applicable to this invention.
Figure 3B:
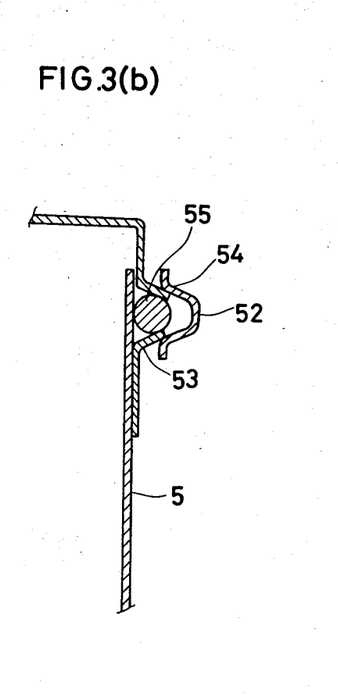
FIG. 3(b) is a partial sectional view of the seal.
Figure 3C:
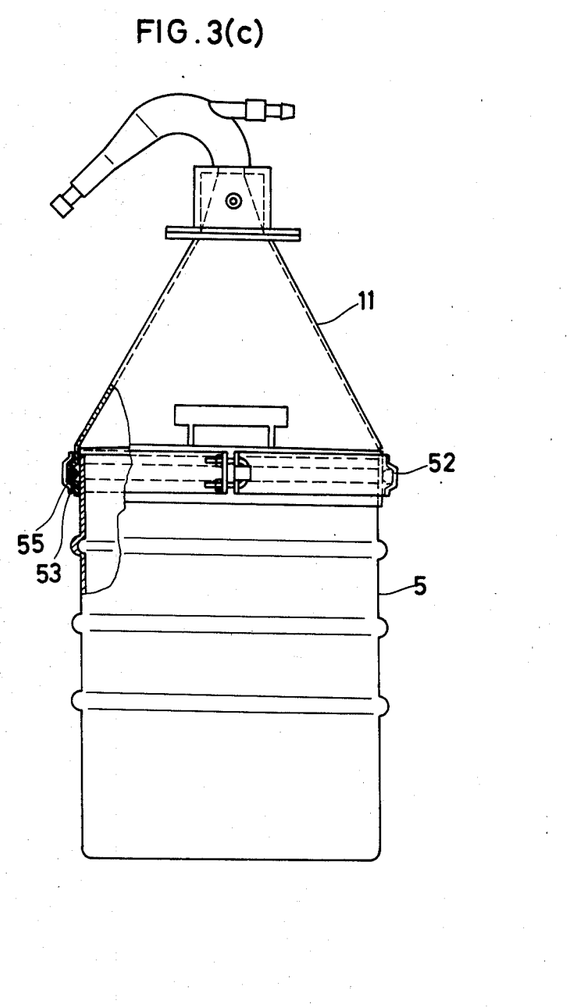
FIG. 3(c) is a side view of the container with a conical part attached.

FIG. 3(a) shows a pressure-resisting container 5. The lid 51 of the container 5 is coupled in an airtight manner with the container 5 by a band 52 in a manner that, as shown in FIG. 3(a) and FIG. 3(b), the band 52 binds tightly to a flange 53 fixed to the container 5 and the rim 54 of the lid 51 through a packing 55 positioned between the flange 53 and the rim 54. In the event that the pressure-resisting container 5 is employed instead of the aforementioned non-pressure-resisting container 100, the band 52 may be also applied as a means for connecting the container 5 to the conical part 11 as shown in FIG. 8(c). In this case, the manner that the conical part 11 is coupled with the container 5 is the same as the means by which the lid 51 is coupled with the container 5.

Figure 4A:
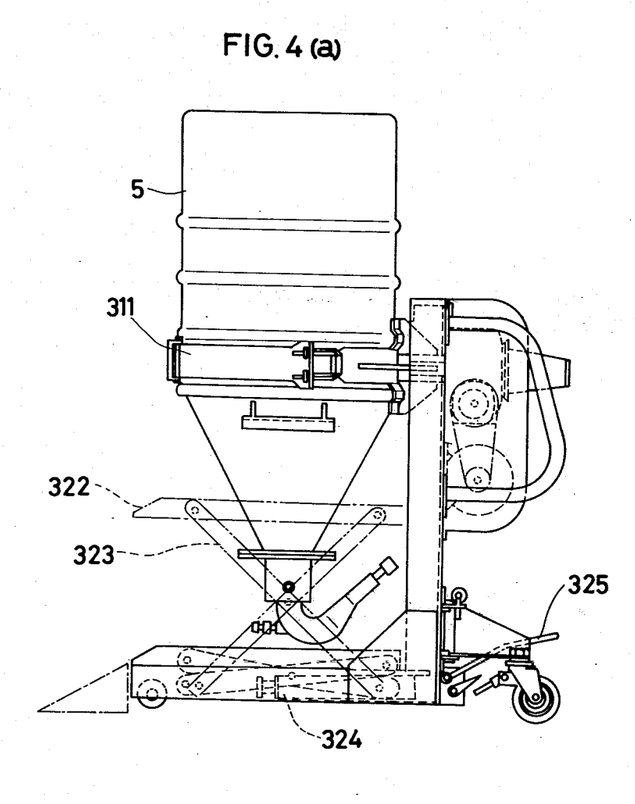
FIGS. 4(a) and 4(b) are semi-pictorial view of the transporter with the pressure-resisting container.
Figure 4B:
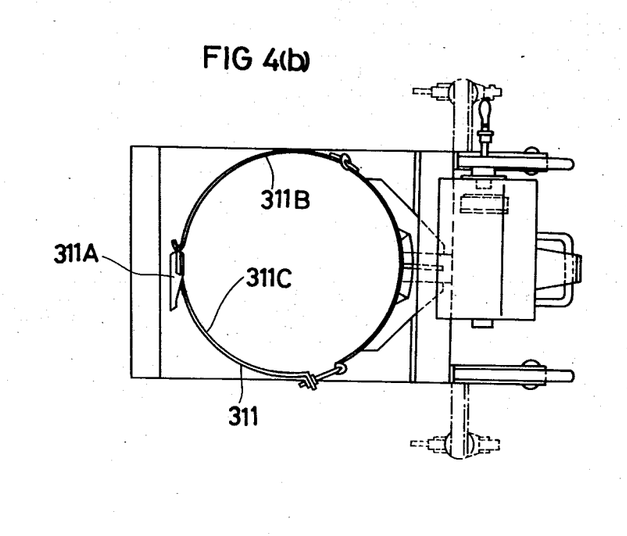

FIG. 4(a) and FIG. 4(b) show the inverted container 5 which is connected with the conical part 11 by the connecting means 3. In this embodiment, a band 311 is used instead of the bracket 31. The band 311, which is of a type widely used in industry, utilizes a pressure clasp 311A to fasten the two ends of the band 311B & 311C. An elevating board 322 may be used instead of the aforementioned elevator 32, which is supported by a lifting arm 323 and lifted by a hydraulic pump 324 which is mounted on the bottom of the cart 2. The position of the elevating board 322 may be controlled by a pedal 325. The elevating board 322 is lowered by operation of the pedal 325 once the container 5 has been connected with the conical part 11.

FIG. 5 shows, in addition to the aforementioned pipe arrangement 12, a level-meter LM, of the widely used torque type, attached to the hopper 13, a pressure detector PD, and a control box CB mounted on the cart 2.

Figure 6:
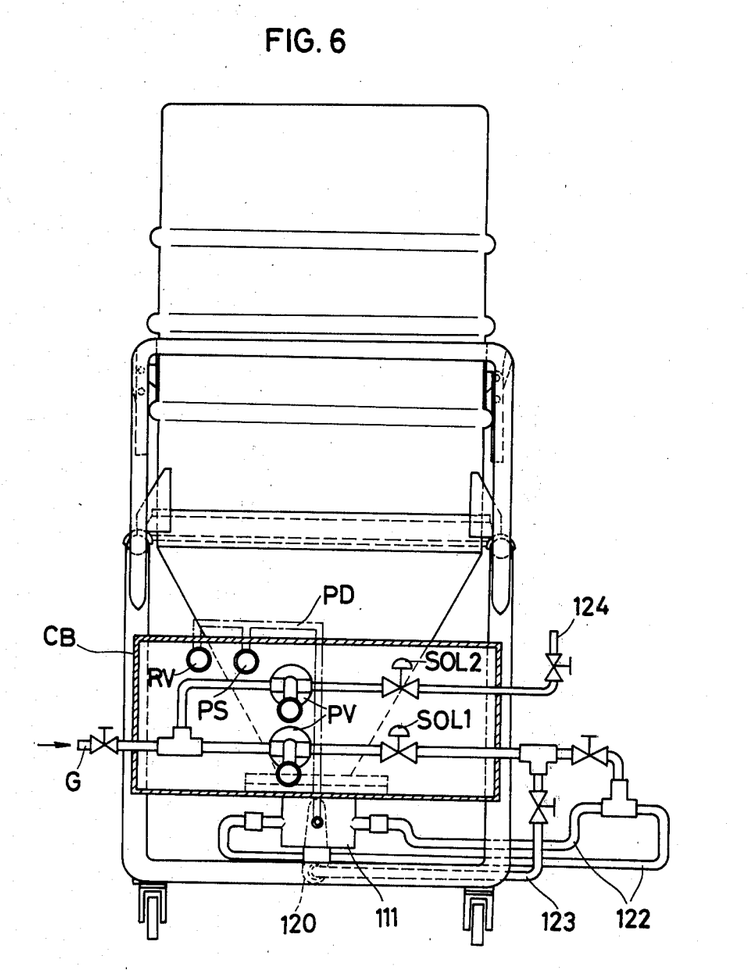
FIG. 6 is a diagram of a segment of the pipe arrangement.

FIG. 6 shows the inside of the control box CB where the reference numeral SOL 1 is an electric magnet valve performing the opening and closing operation for the first and second pressurized gas feed-pipes 122 & 123 according to the on-and-off operation of the level-meter LM; SOL 2 is electric magnet valve performing the opening and closing operation for the third pressurized gas feed-pipe 124 according to the on-and-off operation of the level-meter LM; PV is a pressure release valve; G is a pressurized gas feed opening; PS is a pressure switch connected to the pressure detector PD; and RV is a relief valve.

Figure 7:
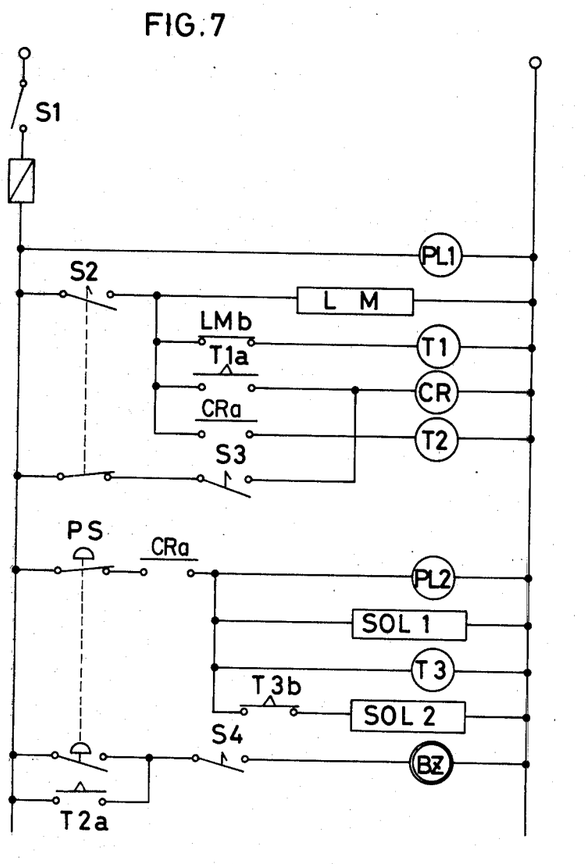
FIG. 7 is a wiring diagram of the pipe arrangement.

FIG. 7 shows a control circuit for controlling the operation of each part in the box CB, where the reference numeral S1 is a switch for the electric power source; S2 is a change-over switch for a change between automatic operation and manual operation; S3 and S4 are switches used for manual operation; LM is the level-meter described above; LMb is the switch in the level-meter LM, which turns off the operation when the rotation wings of the level-meter become immovable due to an excess of the powdered materials in the hopper; T1 is a delay timer for transportation of the powdered materials; CR is a relay connected to switch T1a of the timer T1; T2 is an alarm timer connected to switch CRa of the relay CR; PS is the pressure switch mentioned above; T3 is a timer used to regulate the period of time of the opening operation of the magnet valve SOL 2; T3b is the switch of the timer T3; BZ is an alarm device connected to the switch T2a of the timer T2 and the pressure switch PS through a manually operated switch S4; S3 is a manually operated switch for manually supplying the powdered materials to the hopper; and PL1 and PL2 are pilot lamps.

The time set on timer T1 corresponds to the interval between contiguous supply powdered materials when the machinery is not in operation. The time set on timer T2 is longer than the period of time necessary for the supply of the powdered materials to the hopper 13. The time set on timer T3 is delayed from that of timer T1 for a period of a few seconds.

A predetermined period of time is set on each of the timers T1, T2 & T3 and the power switch S1 is turned on. As soon as the manually operated switch S3 is turned on, the relay CR is closed so that the switch CRa is turned on. Thus, the first magnet valve SOL 1 opens, so that the first and second pressurized gas feed-pipes 122 & 123 open and the powdered materials 102 in the container 100 are transported, by means of the pressurized gas from the first and second feed-pipes, from the discharging section 111 to the hopper 13 through the sigmoid pipe 121. The gas flow from the first feed-pipe 122 mainly serves to mix the powdered materials in the discharging section 111 with the gas. The gas flow from the second feed-pipe 123 mainly serves to send the powered materials to the hopper 13. When a given amount of the powdered materials are deposited in the hopper 13, the manually operated switch S3 is turned off and the change-over switch S2 is turned to the automatic operation thereby turning on the level-meter LM. In the event that the powder depositions in the hopper 13 are great enough to prevent the rotation of the wings of the level-meter LM, the switch LMb is turned off and the delay timer T1 is de-energized. In the event that the powder depositions in the hopper 13 are small, the switch LMb is turned on so that the delay timer T1 becomes energized along with the level-meter LM. When the period of time set on the timer T1 is over, the switch T1a of the timer T1 is turned on so that the relay CR is closed and the switch CRa becomes closed. Thus, the first magnet valve SOL 1 opens and the first and second pressurized gas feed-pipes 122 & 123 open thereby injecting the gas into the discharging section 111 and the sigmoid pipe 121 through these feed-pipes 122 & 123 thus initiating the transportation of the powdered materials from the discharging section 111 to the hopper 13 in the same manner as described above. Subsequently the second magnet valve SOL 2 also opens and accordingly the third pressurized gas feed-pipe 124 opens. The gas from the third feed-pipe 124 continues to feed to the sigmoid pipe 121 during the period of time set on the timer T3, so that the gas serves to continue the flow of the powdered materials within the sigmoid pipe 121 even after the first magnet valve SOL 1 is closed by the manually operated switch S3 when the change-over switch S2 is switched to automatic. The feed of the gas from the third feed-pipe 124 to the sigmoid pipe 121 automatically stops when the period of time set on the timer T3 is over.

At the time when the powder-depositions in the hopper 13 reach a predetermined level and the rotation wings of the level-meter LM become inoperable, the switch LMb is turned off and the delay timer T1 is de-energized and the switch T1a becomes open. Thus, the relay CR is de-energized and the switch CRa becomes open, so that the first magnet valve SOL 1 is de-energized, thereby closing the first and second pressurized gas feed-pipes 122 & 123. Then, when the rotation wings of the level-meter LM become rotatable as the powder-depositions in the hopper 13 decrease with a discharge of the powdered materials from the hopper 13 to the mixing, packaging or pilling machines, the switch LMb of the level-meter LM is again turned on and the delay timer T1 is again energized, thereby automatically re-starting the transportation of the powdered materials from the container 100 to the hopper 13 in the same manner as mentioned above.

When the switch CRa is closed, even after the given period of time for transportation of the powdered materials has been passed, and when the container 100 has become empty and there is nothing to be transported from the container 100 to the hopper 13, the switch T2a in the alarm timer T2 is closed and the alarm device BZ is activated. The alarm device BZ also operates according to the detection operation of the pressure switch PS for detection of an abnormally high pressure in the container 100.

What is claimed is:

1. A pressurized gas transporter comprising:
(1) a transporting means having a conical part, including a discharging section, and a pipe arrangement connected to one end of said conical part; and
(2) a carrier cart having a frame; a connecting means mounted on said frame for uniting a container, wherein powdered materials for the like are stored, to said conical part forming an air-tight system; and a turning means on said frame for inverting said container together with said conical part; said connecting means having a locking means for fixing said conical part to said cart, elevator means for raising the container to be air-tightly sealed to the conical part and for supporting said container thereon, and a frame for connecting said locking means with said elevator means.

2. A pressurized gas transporter according to claim 1, wherein said turning means has a shaft connected to a motor through the frame of said cart, said shaft connecting with the frame of said connecting means.

3. A pressurized gas transporter according to claim 1, wherein said pipe arrangement comprises a sigmoid-shape transporting pipe, a first pressurized gas feed-pipe, a second pressurized gas feed-pipe, and a third pressurized gas feed-pipe; said sigmoid pipe being connected to the discharging section of said conical part at its lower end, to a hopper at its higher end, to the second feed-pipe at its lowest base and to the third feed-pipe at a specified intermediate location thereon; and said first pressurized gas feed-pipe being connected to the discharging section of the conical part.

4. A pressurized gas transporter according to claim 3, wherein said pipe arrangement further comprises:
(1) a first electric magnet valve (SOL 1) connected to said first and second feed-pipes, said first valve operating according to the on-and-off operation of a level-meter attached to said hopper; and
(2) a second electric magnet valve (SOL 2) connected to said third feed-pipe, said second valve performing the on-and-off operation according to said level-meter through a timer (T3);
whereby feed of said powdered materials or the like to said hopper is automatically stopped or started again based on the operation of said first valve, and said second valve opens, at the time when the feed is re-started, thereby to inject the pressurized gas into said sigmoid pipe through said third feed-pipe.

5. A pressurized gas transporter according to claim 1, wherein said container is a non-pressure-resisting tank covered by a metallic cylinder.

6. A pressurized gas transporter according to claim 1, wherein said conical part has a recession at the larger end thereof in a manner that the top rim of said container is bound airtight to said recession through a packing held in said recession.

7. A pressurized gas transporter according to claim 1, wherein said elevator means has a recession at the rim thereof in a manner that the rim of said container is bound airtight to said recession through a packing held in said recession.

8. Process for transporting powdered materials or the like with pressurized gas, comprising:
(1) fixing a conical part of a transporting means to a locking means of a connecting means installed on a carrier cart;
(2) placing a container, wherein said powdered materials are stored, on an elevator of said connecting means, said elevator being coupled with said locking means by a frame;
(3) connecting said container in an airtight manner to said conical part by raising said elevator;
(4) inverting said container together with said conical part by a turning means having a shaft which is connected to a motor at the one end and to said connecting means at the other end through the frame of said cart; and
(5) injecting pressurized gas into a pipe arrangement from a discharging section of said conical part to a hopper, thereby transporting said powdered materials or the like from said container to said hopper.

* * * * *